(12) United States Patent
Stolze et al.

(10) Patent No.: US 7,006,990 B2
(45) Date of Patent: Feb. 28, 2006

(54) ELECTRONIC PRODUCT CATALOG SYSTEMS

(75) Inventors: Markus Stolze, Adliswil (CH); Michael Stroebel, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 09/844,152

(22) Filed: Apr. 27, 2001

(65) Prior Publication Data

US 2002/0004764 A1 Jan. 10, 2002

(30) Foreign Application Priority Data

Apr. 27, 2000 (EP) .................................. 00108933

(51) Int. Cl.
*G06F 17/60* (2006.01)
(52) U.S. Cl. .......................................... 705/27; 705/26
(58) Field of Classification Search ................. 705/26, 705/27, 28, 29, 30, 10
See application file for complete search history.

(56) References Cited

U.S. PATENT DOCUMENTS

| | | | | |
|---|---|---|---|---|
| 5,717,865 | A | * | 2/1998 | Stratmann ..................... 705/10 |
| 5,721,832 | A | * | 2/1998 | Westrope et al. .............. 705/27 |
| 5,884,282 | A | * | 3/1999 | Robinson ...................... 705/27 |
| 5,897,639 | A | * | 4/1999 | Greef et al. ............ 707/103 R |
| 6,035,283 | A | * | 3/2000 | Rofrano ........................ 705/27 |
| 6,041,311 | A | * | 3/2000 | Chislenko et al. ............ 705/27 |
| 6,070,149 | A | * | 5/2000 | Tavor et al. .................. 705/26 |
| 6,633,852 | B1 | * | 10/2003 | Heckerman et al. .......... 705/27 |

FOREIGN PATENT DOCUMENTS

JP 2000-90096 * 3/2000

OTHER PUBLICATIONS

Linda Himelstein. P& G Gives Birth to a Web Baby: It's reflect.com melds P&G's labs and Silicon Valley savvy. Business Week. Sep. 27, 1999.*

* cited by examiner

*Primary Examiner*—James S. McClellan
(74) *Attorney, Agent, or Firm*—Daniel P. Morris, Esq.; Perman & Green, LLP.

(57) ABSTRACT

Methods are provided for selecting a question to be presented to a user of an electronic product catalog system (1) to assist identification of a suitable product from a set of potentially suitable products according to the user's needs. The question is selected from a group of questions stored in the system (1). The methods use product data, which defines features of products in the product set and product scores associated with respective products in the product set, and rule data which defines rules relating answers associated with the questions to product feature constraints. The product data and rule data are processed to calculate question scores ($Q_S$) for respective questions such that the question score ($Q_S$) for each question is dependent on at least one of (a) the product scores of any products excluded from the product set if a rule relating to an answer associated with that question is effective, and (b) the product scores of any products retained in the product set if a rule relating to an answer associated with that question is effective. The question to be presented to the user is then selected in dependence on the question scores ($Q_S$). The disclosed methods allow questions to be selected to facilitate identification of a suitable product from an arbitrary initial product set, allowing needs-based interviewing to be conducted after feature-based filtering in catalog systems. Corresponding apparatus is also provided.

27 Claims, 6 Drawing Sheets

Question
How do you want to use your computer?

Possible Answers: private use, business use, technical use

[Set Answer]
[Skip Answer]

Remaining Items
laptop 1
laptop 2
laptop 3
laptop 4

[Remove Item]

Figure 6b

Question
What will you mainly use your computer for?

Possible Answers: game playing, word processing, spread sheets, publishing, programming/CAD, data storage

[Set Answer]
[Skip Answer]

Remaining Items
laptop 1
laptop 2
laptop 3
laptop 4

[Remove Item]

Figure 6c

Question
Do you intend to do presentations with your computer?

Possible Answers: yes, no

[Set Answer]
[Skip Answer]

Remaining Items
laptop 2
laptop 4

[Remove Item]

Figure 7

ELECTRONIC PRODUCT CATALOG SYSTEMS

FIELD OF THE INVENTION

This invention relates generally to electronic product catalog systems, and more particularly to needs-based interviewing in such systems. Particular embodiments of the invention provide methods and apparatus for selecting questions to be presented to users of such systems to assist identification of suitable products according to the users' needs.

BACKGROUND ART

With increasing use of the Internet as an electronic marketplace, electronic product catalogs provide useful tools for advertising goods and services (referred to generally herein as "products") to Internet users. These catalogs are typically run on an Internet server, provided for example by the product supplier or a service provider acting on behalf of multiple product suppliers, and can be accessed via the Internet by potential customers to search for products of interest.

In existing catalog systems, various mechanisms are employed to assist customers in finding the products of particular interest to them. At present, hierarchical navigation is the most common customer guidance mechanism. To support hierarchical navigation, the pages of the electronic catalog are organized according to product categories. Users navigate to the desired product by making multiple selections, each time specifying in more detail what they are looking for. For example, when shopping for an IBM notebook computer at an on-line computer store, the user might reach the relevant section of the catalog by first selecting the product category "Computer Hardware" from a list of categories on the main page of the catalog. On the resulting Computer Hardware page, the user might then select the product category "Notebooks" from another list. The Notebooks page may then give a list of suppliers, from which the user can select "IBM" to reach a page giving further details of IBM notebook PCs. (IBM is a trade mark of International Business Machines Corporation).

Hierarchical product catalogs are easy to build and maintain, and in some situations they are the right tool for users to find the product they are looking for. However, hierarchical navigation is not appropriate for users looking for products which are not represented as a separate product category (e.g. "laptops with at least a 4 GB hard disk and a stick-pointer"), and can also be confusing for users who are not familiar with the technical terms and need help finding products that match their needs (e.g. "I want a computer to do presentations at client sites").

An alternative navigation system is to allow users to filter products according to particular product features. For example, for a general product category like "Notebooks", a list of technical features such as "Processor Speed", "Processor Type", "Hard Drive", etc., may be displayed, each with a pull-down menu allowing the user to specify his requirements for each feature. The catalogue engine then uses the entered features as filter criteria to search its product database for products meeting the user's requirements. The resulting list of products can then be displayed, and the requirements refined if desired to further restrict the matching product set. In some cases, the matching products may then be transferred to a "comparison tool" which provides a side-by-side view of the product details for ease of comparison by the user. Various custom-built electronic catalogs currently use such feature-based filtering as the user guidance mechanism. In addition, the IBM Net.Commerce Catalog Architect Addition provides a catalog building tool that supports shop owners in building feature-based filtering into their catalogs. Feature-based filtering mechanisms like these are useful for experienced users, who know about the relevant product features, or who are at least willing to learn about features by exploring feature explanations provided in the catalog.

A third mechanism for user guidance is so-called "needs-based interviewing". This mechanism is modeled on the way a sales assistant interviews customers about their particular needs to establish which product would be the most suitable purchase. Here users are not asked about preferred product features, but instead are asked about their needs and how they intend to use the product. In the context of buying a notebook computer for example, a typical needs-based interviewing question might be "Do you intend to use spreadsheet software on your computer?". The answers given by users to such questions imply certain product feature constraints, and these constraints are used by the catalog engine to progressively limit the set of potentially suitable products. In particular, the interview follows a predetermined "decision tree" which represents possible lines of questioning in a tree structure. The idea is that an interview always starts with the same question, at the root of the tree, and the user's answer provides an initial constraint which excludes, from the complete set of products in the product database, those products which are unsuitable for the user. For each possible user answer, the next question to be presented to the user is defined in the decision tree, and the answers to this next question imply further constraints to limit the suitable product set and themselves lead to further questions. Thus, the lines of questioning will follow different routes through the decision tree depending on the user's answers at each stage, and the set of suitable products will be progressively tailored to the user's needs. Currently, such needs-based interviewing mechanisms are offered by relatively few on-line shops. The IBM Net.Commerce Catalog Architect Addition mentioned above also provides support to shop owners in building needs-based interviewing into their catalogs, allowing relevant questions and answers to be input by developers to define the decision tree and enabling rules relating answers associated with questions to product feature constraints to be defined.

Needs based interviewing is particularly useful for novice customers who do not know about technical details and need more assistance with product selection, whereas feature-based filtering as discussed above is particularly useful for experienced customers who know very well what they are looking for. In practice, however, customers will often fall somewhere in the middle of this novice-expert spectrum. Catalogs built with the IBM Net.Commerce tool mentioned above can allow users to start the product selection process using a "Sales Assistant" which does the needs-based interviewing, and then, at any stage in the dialog, to switch to a second view that displays the remaining products in a table and allows feature-based filtering on that product set. However, due to the underlying structure of decision trees discussed above, it is not possible to switch to needs-based interviewing after restriction to an arbitrary product set using feature-based filtering. (For example, it is not possible first to constrain the set of notebook computers to those having a stick-pointer as the pointing device, and only then switch to the "Sales Assistant" for needs-based interviewing on the remaining product set). This is because decision trees are inherently constructed for a predefined initial product set, whereas feature-based filtering can constrain the set of suitable products in any number of ways, rendering use of the decision tree inapplicable to the resulting arbitrary product set.

SUMMARY OF THE INVENTION

In view of the above, it would be desirable to provide a practical system for selecting needs-based interviewing questions to assist identification of a suitable product from an arbitrary initial product set. This in turn would allow needs-based interviewing to be conducted after feature-based filtering, providing a basis for catalog systems in which users can switch freely between the two navigation systems according to the degree of assistance required.

According to one aspect of the present invention there is provided a method for selecting, in an electronic product catalog system, a question to be presented to a user of the system to assist identification of a suitable product from a set of potentially suitable products according to the user's needs, the question being selected from a group of questions stored in said system, which method comprises:

processing product data stored in said system, defining features of products in said set and product scores associated with respective products in said set, and rule data stored in said system, defining rules relating answers associated with said questions to product feature constraints, to calculate question scores for respective said questions such that the question score for each question is dependent on one of (a) the product scores of any products excluded from said set if a said rule relating to an answer associated with that question is effective, and (b) the product scores of any products retained in said set if a said rule relating to an answer associated with that question is effective; and selecting the question to be presented to the user in dependence on said question scores.

Thus, methods embodying the present invention use product scores associated with the products to calculate scores for questions. Question scores are calculated using the rules which link answers associated with the questions to product feature constraints, so that the question score reflects the product scores of one (at least) of (a) those products which would be excluded from the product set, and (b) those products which would be retained in the product set, if a rule relating to an answer associated with the question is effective. The question scores thus provide an indication of the likely change, in terms of product scores, in the product set resulting from asking each question, so that the "best" question to be presented to the user can be selected as that likely to result in the most beneficial change. Thus, embodiments of the invention provide a practical, yet elegantly simple and effective mechanism for selecting needs-based interviewing questions for an arbitrary initial product set.

Embodiments can be envisaged in which question scores are calculated based on the effect of only a single rule, e.g. a rule that is assessed as being the most important in the particular circumstances. As a simple example, each rule may first be assessed to determine which rule, if effective, would result in the highest (or, depending on the nature of the product scores, the lowest) value for the sum of the product scores of the excluded (or retained) products. This rule might then be considered the most important rule for distinguishing between products in the product set, and question scores could then be assigned based on whether the rule involves zero, one or more answers associated with a given question. In preferred embodiments, however, the effect of more than one rule is considered in calculating the question scores. The rules considered could be all rules in a rule database of the system, or only those rules which are identified as relevant for distinguishing between products in the current product set, i.e. those rules involving feature constraints which would distinguish between the products. Either way, in preferred embodiments the question score for each question can be dependent on one (at least) of: (a) for each rule relating to any answer associated with that question, the product scores of any products excluded from the product set if that rule is effective; and (b) for each rule relating to any answer associated with that question, the product scores of any products retained in the product set if that rule is effective. In this way, the effect of all rules which relate to answers associated with a particular question contributes to the question score for that question.

The particular way in which the question scores are calculated can vary in different embodiments depending on factors such as the nature of the product scores themselves, what (if any) further parameters are to be taken into account, and how the change in the product set is measured. As one example, in some embodiments each rule may be considered in turn and the sum of the product scores for products that would be excluded from the product set if that rule is effective calculated. This sum value, or a value derived therefrom, could then be assigned to the question associated with each answer to which the rule relates. The resulting question scores would then be the accumulation of the values assigned in this way after all rules have been considered. In particularly preferred embodiments, the question scores are calculated by first calculating a rule weight for each rule, the rule weight depending on one (at least) of (c) the product scores of any products excluded from the product set if that rule is effective, and (d) the product scores of any products retained in the product set if that rule is effective. Then, for each rule, answer scores dependent on the rule weight are assigned to each answer to which that rule relates. The question score for each question can then be calculated from the answer scores assigned to the answers associated with that question after all rules have been considered. Whether the best question is then indicated by a high or a low question score will depend, for example, on the nature of the product scores and the particular method employed for rule weight calculation.

The product scores themselves can be arbitrary values and may be assigned in various ways to reflect the relative "merit" of products according to some desired criterion. In the simplest case, the product scores can be predetermined in the system for respective products, so that, for example, each product has an associated, pre-assigned product score which can be used in any rule weight calculation. For example, the product scores may comprise product probabilities which indicate the probability of the product being suitable for the user according to past experience, e.g. based on the relative popularity of the products as assessed from past sales. Such probabilities can be entered by an operator and stored in the system in advance of operation. In particular preferred embodiments, the product scores comprise product reject probabilities defining the probability of each product being rejected as suitable for the user. Here, the rule weights discussed above can be calculated simply by summing the product reject probabilities of the products that would be rejected by a rule. In this case, the rule weight provides a measure of how likely that rule is to "fire", i.e. to be effective, if the appropriate question or questions are asked. Thus a higher rule weight indicates a more important rule, which is more likely to distinguish between products in the product set. If the question scores are then calculated as discussed above by accumulating answer scores which directly reflect the rule weights, then a higher question score indicates a more important question, and the question with the highest score can be selected to be asked first. In other embodiments, the rule weight may reflect the expected "utility" of products remaining in the product set if the rule fires, for example based on a "resultant set value" calculated for the resulting set of remaining products. This resultant set value could be based, for example, on the sum of product scores which define the expected utility of products (e.g. as probabilities of respective products being selected based on past experience), or the set value could be based on summing (1−reject probability) for the retained products if the product scores indicate product reject probabilities. However, while the product scores may be predetermined for products in advance of operation as discussed above, in other embodiments the product scores associated with respective products may be calculated in operation in dependence on values assigned to product features by the rules. For example, the rules may assign "utility values" to product features for particular answers to questions, and the product score for a particular product may be calculated on a rule-by-rule basis by summing the utility values assigned to features of that product by a particular rule. Here, the products retained if a particular rule fires are those with non-zero product scores as determined by that rule. This will be explained further below, but in such cases the resultant set value can be calculated based on the product scores calculated for products in the product set if the rule in question fires. The resultant set value may take into account all products remaining in the product set if the rule fires, or only a subset (or "focus set") of these products. This focus set may be, for example, the top n products ranked in dependence on the product scores, e.g. in order of expected utility. In particular preferred embodiments, the rule weight is dependent on the difference between a current set value, calculated for the current product set, and the resultant set value, and more specifically on the change in the focus set value resulting from firing of the rule. These set values, or focus set values, could be calculated based solely on product utilities as indicated by the product scores, but may also depend on other parameters. For example, while the product scores may indicate expected utility of the product to the user, as user scores or "buyer scores", the product scores may also comprise "seller scores" which indicate the utility of the product from the product supplier's perspective in terms of the benefit resulting from sale of the product. For example, seller scores may reflect profit margins, or the degree to which the product supplier wishes to promote different products. Additional parameters may also be involved in focus set values as described further below.

While methods embodying the invention allow selection of an initial question to be presented to a user for an arbitrary initial product set, if the interview proceeds further then additional questions may be selected for presentation to the user. As successive questions are answered, information about the users needs is accumulated. In some embodiments, the same product scores may be applied for selecting successive questions. In other embodiments, a group of product scores may be associated with each product, each score being applicable for a different set of defined user needs. For example, different product reject probabilities may be applicable for different stages in an interview according to the set of user needs specified thus far. While such product scores may be pre-assigned based on experience of the product supplier or catalog service provider, in preferred embodiments the system can automatically collect statistical data based on the outcome of interviews conducted in operation, and uses this statistical data to assign and refine product scores for different sets of known user needs.

Methods embodying the invention may be employed in an interview management component which is designed to interface with an existing catalog engine which uses feature-based filtering. In this case, the feature-based engine may supply data defining the current product set to the interview component when a needs-based interviewing question is required for presentation to the user interacting with the feature-based engine. The interview component can then select and supply the question to the feature-based engine for display to the user. Of course, however, methods embodying the invention may also be implemented in an integrated system designed to provide both feature-based filtering and needs-based interviewing as required by the user, in which case the product set resulting from prior feature-based filtering is simply used as the initial product set on switching to needs-based interviewing.

Another aspect of the present invention provides apparatus for selecting a question to be presented to a user of an electronic product catalog system to assist identification of a suitable product from a set of potentially suitable products according to the user's needs, the apparatus comprising:

memory for storing question data, comprising a group of questions from which a question is to be selected, product data, defining features of products in said set and product scores associated with respective products in said set, and rule data defining rules relating answers associated with said questions to product feature constraints; and control logic configured to process said product data and said rule data to calculate question scores for respective said questions such that the question score for each question is dependent on one of (a) the product scores of any products excluded from said set if a said rule relating to an answer associated with that question is effective, and (b) the product scores of any products retained in said set if a said rule relating to an answer associated with that question is effective;

wherein the control logic is configured to select the question to be presented to the user in dependence on said question scores.

In general, it is to be understood that, where features are described herein with reference to a method embodying the invention, corresponding features may be provided in accordance with apparatus embodying the invention, and vice versa.

The invention also provides an electronic product catalog system comprising apparatus as described above. A further aspect of the invention provides a computer program element comprising computer program code means which, when loaded in a processor of an electronic product catalog system, configures the processor to perform a method as described above.

BRIEF DESCRIPTION OF THE DRAWINGS

Preferred embodiments of the invention will now be described, by way of example, with reference to the accompanying drawings in which.

DETAILED DESCRIPTION OF THE PREFERRED EMBODIMENTS

Figure 1:
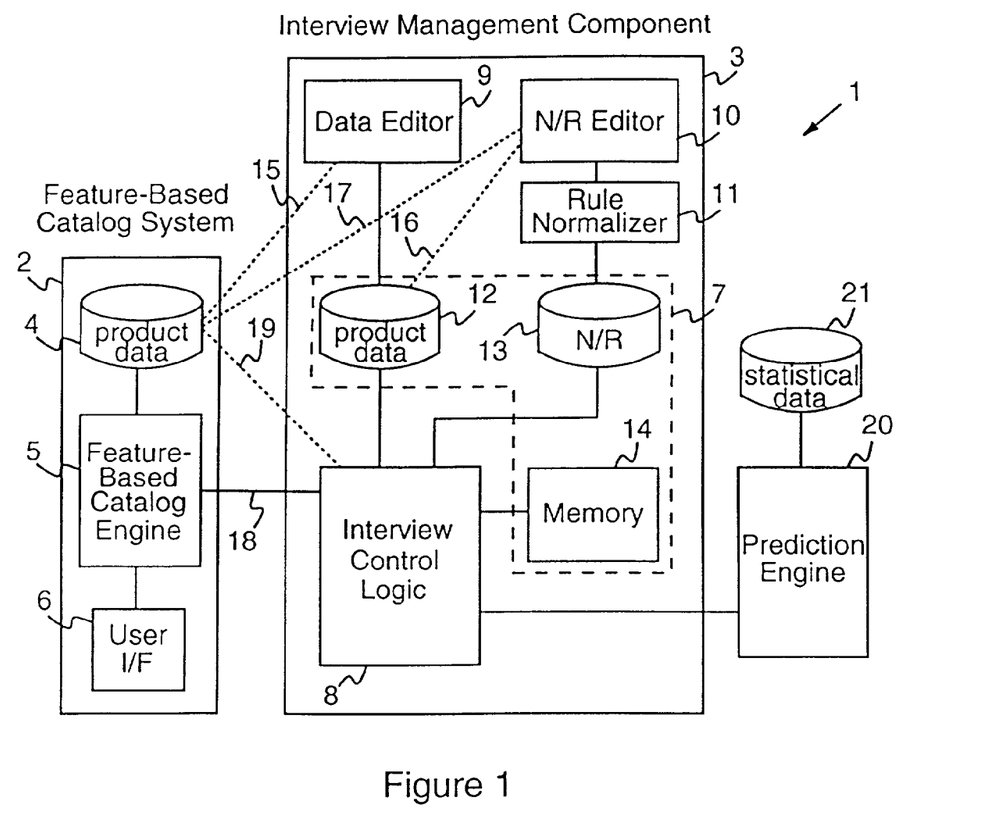
FIG. 1 is a schematic block diagram of an electronic product catalog system embodying the invention.

FIG. 1 shows an embodiment of an electronic product catalog system, indicated generally at 1. The system comprises a feature-based filtering component 2 and an interview management component 3. In this embodiment, it is assumed that the feature-based filtering component 2 is an existing feature-based catalog system, and that the interview management component 3, which performs needs-based interviewing functions as described below, is designed to interface with the feature-based system 2 to extend the functionality of the overall system. Thus, in this embodiment the feature-based filtering component 2 comprises a product database 4 and a feature-based catalog engine 5 which interacts with a user of the system via user interface 6. The product database 4 stores details of catalog products input by the catalog service provider via a database management tool (not shown) of known form. In particular, for each product, a list of product features can be stored, for example as <name, value> pairs where "name" indicates the feature type (e.g. "pointing device") and "value" indicates the feature description (e.g. "stick pointer"). The catalog engine 5 is generally implemented by a processor running feature-based catalog software to allow filtering of products defined in database 4 in known manner based on feature constraints specified by the user via user interface 6.

The interview management component 3 comprises interview control logic 8, memory as indicated generally at 7, a data editor 9, a needs & rules editor (N/R editor) 10 and a rule normalizer 11. As illustrated in the figure, memory 7 comprises a product database 12, a needs & rules (N/R) database 13, and a local memory 14 associated with control logic 8. The data editor 9 is essentially a database management tool of generally known type which supports a system operator in defining the product data to be stored in product database 12, and can be implemented by a processor running a database management program. The data editor can also read data from the product database 4 of feature-based component 2 via a custom interface 15 as discussed further below. The N/R editor 10 similarly comprises a database management tool, in this case for supporting a system operator in defining question data and rule data to be stored in N/R database 13 after processing of rules in rule normalizer 11 as discussed further below. The N/R editor 10 can access data in product database 12 via interface 16, and can also read data from database 4 of component 2 via custom interface 17. Again, N/R editor 10 and rule normalizer 11 can be implemented by a processor running appropriate programs, and suitable software will be apparent to those skilled in the art from the description herein.

The interview control logic 8 forms the core of component 3 and performs the main functions involved in providing a needs-based interviewing facility to feature-based component 2. Control logic 8 can interact with catalog engine 5 via custom interface 18, and can also access product database 4 of this component via custom interface 19. In this embodiment, control logic 8 also interfaces with a prediction engine 20, with associated database 21, the function of which will be described below.

Figure 2:
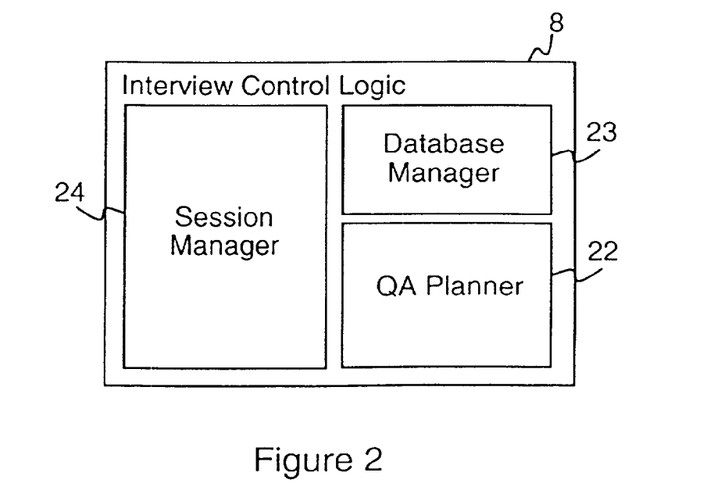
FIG. 2 is a more detatiled schematic of the interview management control logic in the system of FIG. 1.

FIG. 2 is a more detailed schematic of the main elements of control logic 8. As illustrated, the control logic includes a question & answer planning component (QA planner) 22 which performs the question selection and answer processing functions described in detail below. The control logic also includes a database manager 23 via which the QA planner 22 accesses data stored in memory 7 and in product database 4 of the feature-based filtering component 2. The control logic 8 also includes a session manager 24 which manages the interactions between QA planner 22 and feature-based catalog engine 5 for particular needs-based interviewing sessions. In general, control logic 8 may be implemented in hardware or software, or a combination thereof. Typically, however, the components of control logic 8 will be implemented by one or more processors running programs which configure the processor to perform the functions described, and suitable software will be apparent to those skilled in the art from the description herein. The memory 14 may be an internal memory of such a processor or an external memory accessible by the processor. Where the control logic components (and also the editors 9, 10 and rule normalizer 11 described above) are implemented with software, the program code may be supplied separately (as an independent element or as an element of the program code for a number of control functions) for loading in the system to configure the processor(s) to operate as described.

Prior to operation of the catalog system 1, the catalog operator must setup the interview component 3 to operate with the existing product catalog used by feature-based filtering component 2. This involves input and storage of the product data and the needs & rules data in databases 12 and 13. Specifically, data editor 9 reads the product details from database 4 via interface 15, and for each product the operator is asked to input a product score. For the specific examples described below, this product score is in the form of a product reject probability $P_{reject}$ which indicates the probability of the associated product being rejected by the user. These probabilities can be assessed by the operator based on experience of the relative popularity of products from past sales. For each product, the product score is stored in product database 12 together with data identifying the product, for example the address of that product description in database 4. (Since the interview control logic can access product feature data directly from database 4 via interface 19 in this embodiment, it is not necessary to duplicate the product feature data in database 12 here, though this could be done in other embodiments if desired). The N/R editor 10 can similarly read product descriptions from database 4 (and access data in product database 12 if required depending on the particular data stored in this database), and allows the operator to input questions about a user's needs that will assist in distinguishing between the various products. These "needs-questions" can be the same type of questions that a sales assistant would ask a customer in a real shop to establish which product would be most suitable according to that particular customer's needs. For each question, the operator inputs a set of possible answers, and indicates how these answers map to product feature constraints. That is, N/R editor 10 supports the operator in defining rules which relate particular answers, or combinations of answers, to the product features which those answers imply will be necessary for a product to be suitable for the user. For example, considering a rule-base about laptop computers, the operator might define a need <presentations> with the question "Do you intend to do presentations with your computer?" and possible answers <yes> and <no>. In addition, the operator might define a rule: "if (<presentations>=<yes>) then-require (<LCD screen type>=<active>)" which indicates that for doing presentations one should have a laptop computer with active LCD screen. In this embodiment, the operator is also prompted to input an answer probability $P_{answer}$ for each answer to a question, indicating the probability of each answer being given by the user based on the operator's experience. Thus, for example, for the above question "Do you intend to do presentations with your computer?", the operator might input an answer probability of 0.3 for the answer <yes>, and an answer probability of 0.7 for the answer <no>. Data defining the various questions and their associated answers and answer probabilities are then stored as "needs" in N/R database 13. The rules are also stored in database 13 after normalization by rule normalizer 11. This normalization is performed in known manner to ensure that "if"-parts of rules are in disjunctive normal form. That is, rule conditions have to be a disjunction of conjunctions that reference each need not more than once, so that rules have the general form:

"if((c1.1(n1)&c1.2(n2)& . . . c1.i(ni))OR((c2.1(n1)&c2.2(n2)& . . . c2.j(nj))OR . . . then . . . "

where n1, n2 etc. represent needs and c1.1, c1.2 etc. represent rule condition clauses. Storing rules in this normal form ensures efficient access and processing by the control logic 8.

Once this setup process has been performed, the interview management component is ready for operation. Briefly, operation of the system is then as follows. A user accesses feature-based catalog 2 and commences searching for products of interest. Catalog engine 5 typically allows the user to select from the screen display certain features which he requires of the product sought. These features are then supplied via user I/F 6 to catalog engine 5 which can search its product database 4 for products matching the specified feature constraints, and supply the resulting list of products for display to the user. At any stage in this process, the user may request needs-based interview assistance by selecting an option from the screen display. When this occurs, the catalog engine 5 issues a request via interface 18 to interview management component 3 for a suitable question to be presented to the user. This question request indicates the session id assigned by catalog engine 5 for the particular user session, and also data indicating the current set of products which have been determined as potentially suitable by catalog engine 5 based on the feature-based filtering conducted thus far. This data can be any data which identifies the products, e.g. a list of product names, or the addresses of the product descriptions in database 4. On receipt of the question request, the session manager 24 of control logic 8 identifies the request as relating to a new interview session from the session id supplied by catalog engine 5, and may, if desired, assign a new "interview session id", or may simply log the supplied session id as the identifier for distinguishing between requests relating to different user sessions. The question request is forwarded (with the new interview session id if appropriate) to QA planner 22. For a new session, as determined from the session id, the QA planner instigates an initialization step to retrieve data relevant to the session from databases 4, 12 and 13. In particular, based on the product set data included in the question request, the QA planner instructs database manager 23 to load the product descriptions for the current set of products from database 4, and the product scores for the current set of products from database 12, to local memory 14. In addition, QA planner 22 obtains needs & rules data from N/R database 13 via database manager 23 and stores this data in memory 14. While all needs-questions and all rules may be extracted from database 13 here, in this preferred embodiment only those questions and rules which are relevant to the current product set are retrieved in this step. The relevant rules are those which involve feature constraints which distinguish between products in the current product set, and the relevant questions are those having associated answers appearing in the rule condition clauses, and can be retrieved by database manager 23 by searching database 13 based on the product features retrieved from database 4 for the current set of products. Thus, the product data and needs/rules data retrieved from system memory can be considered as a combined product, needs & rules database for the current product set which is stored in control logic memory 14 for the current session. (While the retrieval of data forming the combined product, needs and rule database for the product set is performed by the QA planner in this embodiment, in other embodiments this initialization function could be performed by the session manager 24 for each new session).

After this initialization step, the QA planner 22 uses the retrieved data to select the best question to be presented to the user, and then supplies this question (and associated answers) to the catalog engine 5 via session manager 24. Catalog engine 5 then displays the question, and the answer options, to the user via user I/F 6, and relays the answer selected by the user back to control logic 8, via interface 18, with the appropriate session id. QA planner then determines whether any rules have "fired" (i.e. if the rule condition clause is satisfied) in view of the answer, and if so supplies the resulting feature constraint(s) back to the constraint engine 5. Constraint engine 5 can then determine the resulting product set by eliminating products which do not satisfy the feature constraints, whereupon the new product set can be displayed to the user as before. A further question may then be requested from the interview component which again selects the best question, and operation continues in this way until the session is terminated. In operation of the system, the interview sessions are monitored by prediction engine 20 which gathers statistical data on interview progress and outcomes, and uses this to derive predicted values for various parameters relevant to the question selection process as discussed further below. This statistical data is stored in database 21 for use when required by the QA planner as described below.

The question selection method implemented in this embodiment will now be described with reference to the flow chart of FIG. 3. The "select Q" function is called at step 25 in response to receipt of a question request by QA planner 22. (If this is the first question request of the session, the QA planner then performs the initialization steps discussed above to obtain the combined product, needs & rules database for the current product set in memory 14). Next, in step 26, the QA planner determines, for the first rule in memory 14, which (if any) products would be excluded from the current product set if that rule fires. This is determined by comparing the feature constraints specified in the condition clause of the rule with the features specified in the product descriptions. Next, in step 27 the QA planner calculates a rule weight $W_R$ for the rule under consideration. In this embodiment, the rule weight $W_R$ is calculated as the sum of the reject probabilities $P_{reject}$ of any products identified in step 26 as being excluded if the rule fires. The calculated rule weight $W_R$ is stored in memory 14, and in step 28 the QA planner checks if there are any further rules to be considered. Assuming so, the next rule is selected in step 29 and operation reverts to step 26 for this rule. Thus, the QA planner continues to calculate rule weights for successive rules until it is determined in step 28 that all rules have been weighted.

Next, in step 30 the QA planner initializes an answer score variable $A_S$ to zero for each answer appearing in the rule condition clauses. Operation then proceeds to step 31 where a Distribute Weight function, Dist.Wt(RCC, $W_R$), is called for the rule condition clause (RCC) of the first rule. This function Dist.Wt will be described in detail below with reference to FIG. 4. Briefly, however, the function serves to distribute values dependent on the rule weight $W_R$ to the answer(s) specified in the rule condition clause RCC by adding these values to the relevant answer score(s). When this step has been completed for the first rule, the QA planner checks in step 32 if there are any further rules to be considered. Assuming so, the next rule is selected in step 33 and operation reverts to step 31 for this rule. Thus, after all rules have been considered as determined by a "No" at step 32, the weight of all rules will have been distributed to answers and a set of answer scores will have been accumulated in memory 14. In step 34 the QA planner then uses these answer scores to calculate question scores $Q_S$ for each question. In this embodiment, the question score for a given question is calculated by summing the answer scores for the answers associated with that question after first weighting each answer score according to the answer probability specified for that answer. That is:

$$Q_S = \text{Sum over answers } (A_S \times P_{answer})$$

The resulting question scores are stored in memory 14, and in step 35 the QA planner selects the question to be presented to the user as the question with the highest question score $Q_S$.

Figure 4:
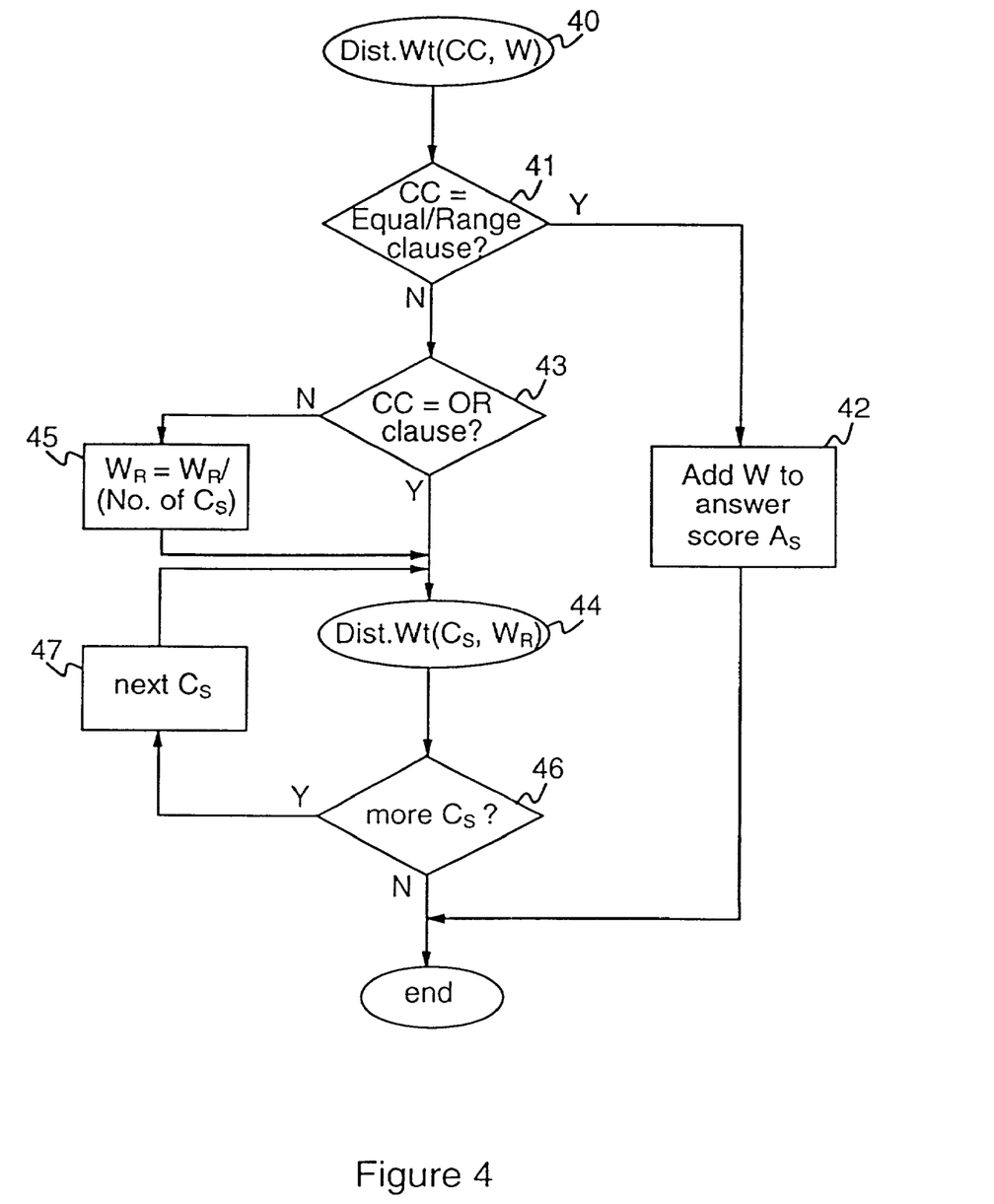
FIG. 4 is a flow chart illustrating operation of a rule weight distribution function used in the method of FIG. 3.

FIG. 4 illustrates operation of the generalized Dist.Wt function Dist.Wt(CC, W) where CC represents a general condition clause, and W a general weight, for which the function is called. This Dist.Wt function is designed on the basis that rule condition clauses RCC may be one of four clause types:

- an "Equal clause", i.e. of the form "If Answer$_i$=x, then . . . ";
- a "Range clause", i.e. of the form "If p $\leq$ Answer$_i \leq$ q then . . . " (used where freeform numeric answers can be input by a user);
- an "OR clause", i.e. a logical OR of two or more subclauses of any type, e.g. "If (Answer$_i$=x) OR ((Answer$_j$=y)AND(Answer$_k$=z)), then . . . "; and
- an "AND clause", i.e. a logical AND of two or more subclauses of any type, e.g. "If (Answer$_i$=x) AND ((Answer$_j$=y)OR(Answer$_k$=z)), then . . . ".

Note that the subclauses of AND and OR clauses may themselves consist of logical combinations of further subclauses.

Figure 3:
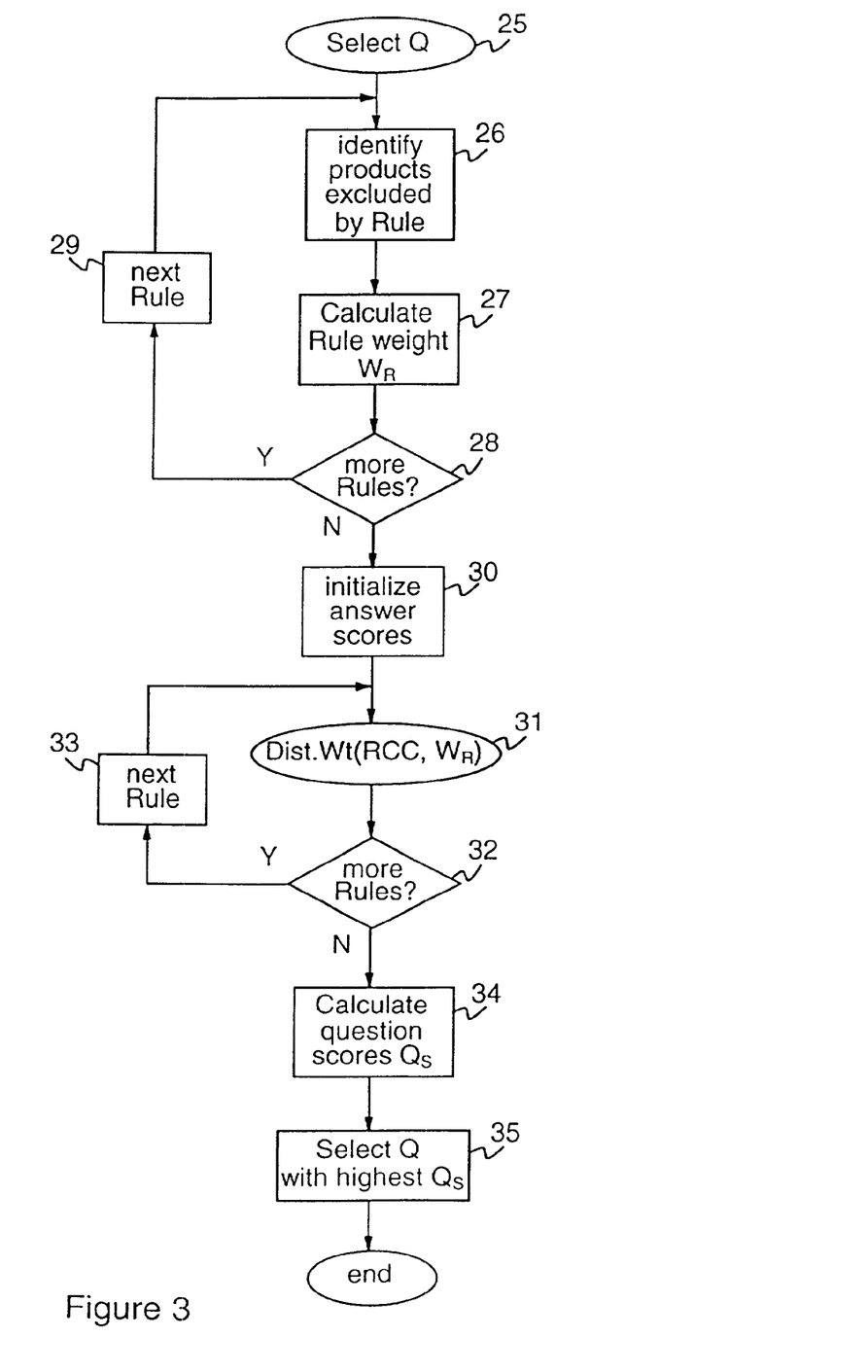
FIG. 3 is a flow chart illustrating an embodiment of a question selection method performed by the interview management component of the system.

When the Dist.Wt(CC, W) function is called from step 31 of FIG. 3, the operation commences at step 40 of FIG. 4 for CC=the rule condition clause RCC, and W=the rule weight $W_R$. Next in step 41 the QA planner checks whether the condition clause CC=RCC is an Equal clause or a Range clause as defined above. If so, then operation proceeds to step 42 where the weight W=$W_R$ is added to the answer score $A_S$ for the answer specified in the condition clause. The process is then complete and operation reverts to the point at which the function was called, here step 32 of FIG. 3. However, if the condition clause is not an Equal or Range clause at step 41, then in step 43 the QA planner checks whether the condition clause CC=RCC is an OR clause as defined above. If so, operation proceeds to step 44. Here, the Dist.Wt function is called again for the first subclause $C_S$ of RCC. Thus, assuming for simplicity that this first subclause $C_S$ is itself an Equal or Range clause, then in this second instance of the Dist.Wt function, Dist.Wt($C_S$, $W_R$), the rule weight $W_R$ will be distributed to the answer specified in the current subclause $C_S$ in accordance with steps 40 to 42 described above. Operation will then return to step 46 of FIG. 4 for the first instance function Dist.Wt(RCC, $W_R$), where the control logic checks if there are any further subclauses $C_S$ of RCC to consider. If so, the next subclause $C_S$ is selected in step 47 and operation reverts to step 44 for this subclause. Thus, for rule condition clauses RCC which are OR clauses consisting of subclauses which are themselves Equal or Range clauses, the rule weight $W_R$ will be added to the answer score of the answer specified in each subclause of the rule condition.

Reverting to step 43, if it is determined here that the rule condition clause is not an OR clause, then it is assumed that the condition clause is an AND clause as defined above. In this case, operation proceeds to step 45 where the rule weight $W_R$ is redefined as $W_R$ divided by the number of subclauses $C_S$ in the rule condition. Operation then proceeds to step 44 where a second instance of the distribute weight function is called as described above. Thus, for rule condition clauses RCC which are AND clauses consisting of subclauses which are themselves Equal or Range clauses, the revised rule weight (initial $W_R$/(Number of $C_S$)) is added to the answer score of the answer specified in each subclause of the rule condition.

It will be seen, however, that whenever a further instance of the Dist.Wt function is called in step 44 for a subclause $C_S$, if the subclause is itself an OR clause or an AND clause of more basic subclauses $C_{SS}$, then the above process will operate recursively, an additional instance of the Dist.Wt function, DiSt.Wt($C_{SS}$, $W_R$) being called for each basic subclause $C_{SS}$, and similarly for any subclauses of this subclause. The process therefore operates for rule conditions containing an arbitrary nesting of AND and OR subclauses, and continues until weights have been distributed to answers specified in the most basic subclauses of the rule condition. When all subclauses $C_S$ of the rule condition clause RCC have been dealt with as determined by a "No" at step 46, the weight distribution process is complete and operation returns to step 32 of FIG. 3.

Consideration of the above process for calculating rule weights $W_R$, answer scores $A_S$ and question scores $Q_S$ will demonstrate that the question selected by the QA planner is that which is most likely to result in restriction of the set of suitable products, and thus is likely to minimize the expected effort in reaching a purchasing decision. The rule weight $W_R$ is directly dependent on the reject probabilities of products rejected if the rule fires, and is thus a measure of the importance of the rule in terms of how likely that rule is to fire and the products that will be excluded from the product set if it does. The rule weight is then distributed, via the answer scores, to the answers necessary for the rule to fire, and then to the question scores in accordance with the answers associated with each question. Thus, the question scores reflect the relative importance of the questions in leading to a successful conclusion, the question with the highest score being selected as the best question to ask the user.

Figure 5:
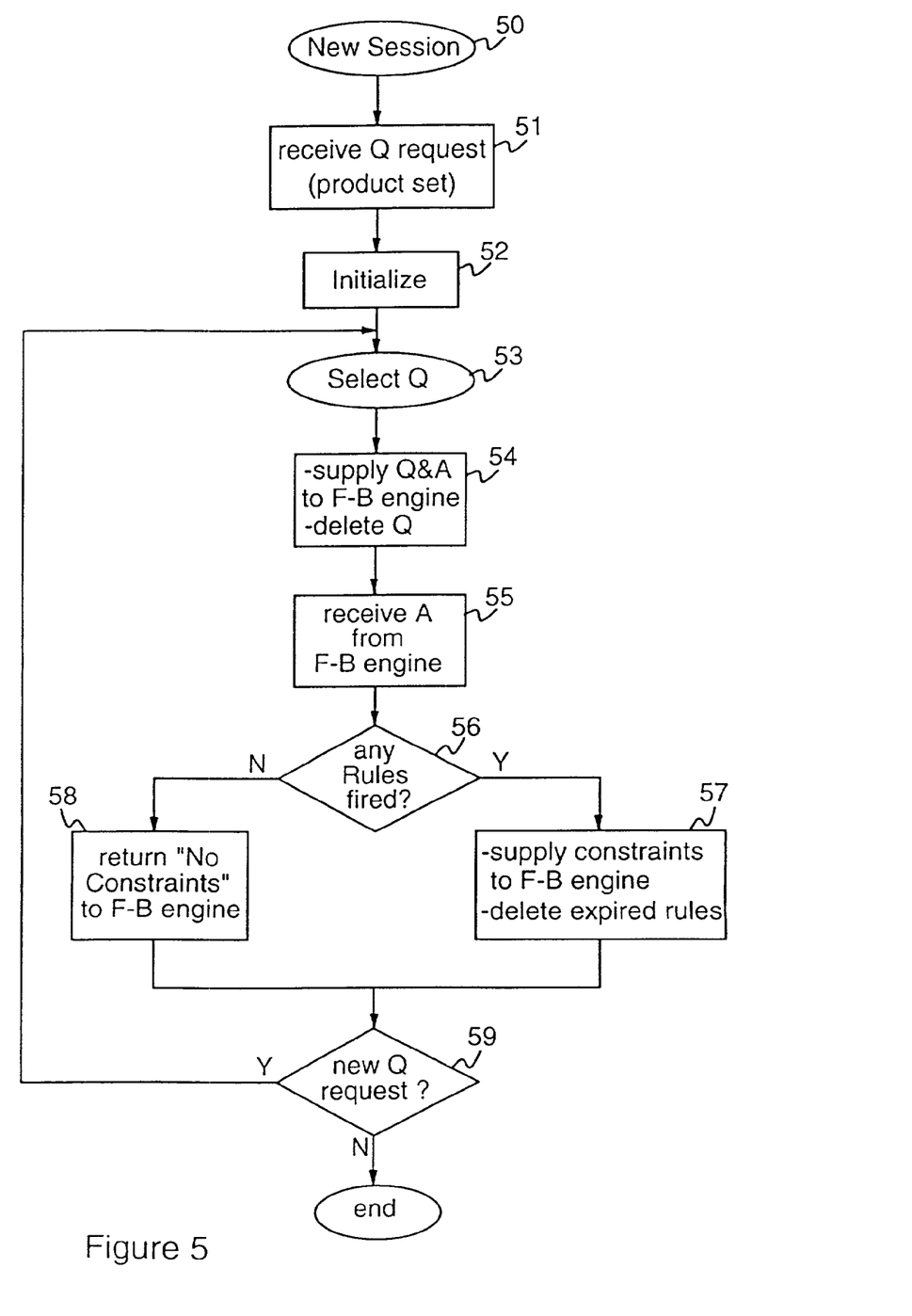
FIG. 5 is a flow chart illustrating an example of a needs-based interviewing session in the system of FIG. 1.

FIGS. 3 and 4 describe the basic question selection process performed by the QA planner 22, but, as described earlier, a needs-based interviewing session may involve selection of successive questions at the request of the feature-based catalog engine 5. The flow chart of FIG. 5 illustrates the basic steps of a complete interviewing session in the QA planner 22. The new session begins at step 50 and the question request is forwarded to the QA planner by the session manager 24 as previously described. Step 52 represents the initialization process where the QA planner retrieves the relevant data for the current product set as described above. In step 53 the QA planner selects the best question in accordance with FIGS. 3 and 4 above. In step 54, this question, and associated answers, are supplied to the feature-based (F-B) engine 5 for display to the user. The selected question is then deleted from the combined product, needs & rules database in memory 14, and is thus excluded from further consideration. When supplying the answers here, the QA planner need not supply all the answers which are defined in the Needs data as associated with a particular question. In particular, the QA planner preferably selects only those answers which had a non-zero answer score as a result of the rule weight distribution process, since these are the answers which are relevant for causing rules to fire. Moreover, the QA planner preferably supplies these answers for display in the order of importance, i.e. in order of decreasing answer score. For numeric variables, freeform numeric input may be allowed by way of answer by the user, or the QA planner may provide as answers a set of numeric ranges based on the ranges specified in the range condition clauses of the relevant rule. Again, these range answers could be ordered according to the answer scores, but are preferably presented in logical order of the numerical ranges themselves.

After the user has answered the question, the F-B engine 5 returns the given answer to the interview component 3 where it is received by the QA planner at step 55 of FIG. 5. The QA planner checks in step 56 whether the answer results in firing of any rules. If so, in step 57 the QA planner identifies the feature constraint(s) required by the fired rule(s) and supplies these to the F-B engine 5 via session manager 24. The engine 5 then determines from the constraint(s) whether any products are excluded from the set of potentially suitable products, and displays the resulting product set to the user. (In other embodiments, the QA planner could supply the list of remaining products, rather than just the feature constraints, to the F-B engine if desired). In the QA planner 22, fired rules (and any other rules which are rendered redundant as a consequence) are considered expired and are deleted from the combined product, needs & rules database in memory 14, thus excluding these rules from further consideration.

Reverting to step 56, if no rules have fired here, then in step 58 the QA planner returns a "No Constraints" message to F-B engine 5, and the product set remains the same. Next, in step 59 the QA planner awaits a further question request relating to the current interview session. If the user needs further assistance (after further feature-based filtering or otherwise), a new question request is received from engine 5 under the same session id. Operation then reverts to step 53 where the next best question is selected based on the new product set defined in the question request. (If products have been excluded from the previously defined product set here, then the QA planner first eliminates the product details for the excluded products from the combined database for this session, so that the product scores for excluded products do not contribute to the question scores in the question selection process). In this question selection process, the same product scores $P_{reject}$ and answer probabilities $P_{answer}$ used in the first question selection process could be employed. However, provision of the prediction engine 20 in this preferred embodiment allows the QA planner to retrieve a new set of product scores $P_{reject}$ and answer probabilities $P_{answer}$ from the prediction engine database 21 based on the current status of the interview session, and in particular the current set of needs and rejected products resulting from previous question-answer cycles. Using generally known techniques which need not be described in detail here, the prediction engine is automatically "trained" by monitoring interview sessions, accumulating statistical data about how users answer the various questions, and which products are rejected as a result, for different stages in interview sessions. Based on this statistical data, the prediction engine can derive (and continually refine) different values for product scores and answer probabilities applicable in different circumstances. These predicted values are stored in database 21. Thus, when selecting the second and subsequent questions in a given interview session, the QA planner 22 can request the applicable values for the current set of known user needs, according to the current status of the interview, from the prediction engine 20, and these values, if available, can be used in place of the original product score and answer probability values.

The session thus continues in accordance with FIG. 5 until no further questions are received at step 59, i.e. until the session is actively terminated by the feature-based engine or QA planner, or, for example, because the session id expires and the session is thus deemed to be terminated.

Figure 6A:
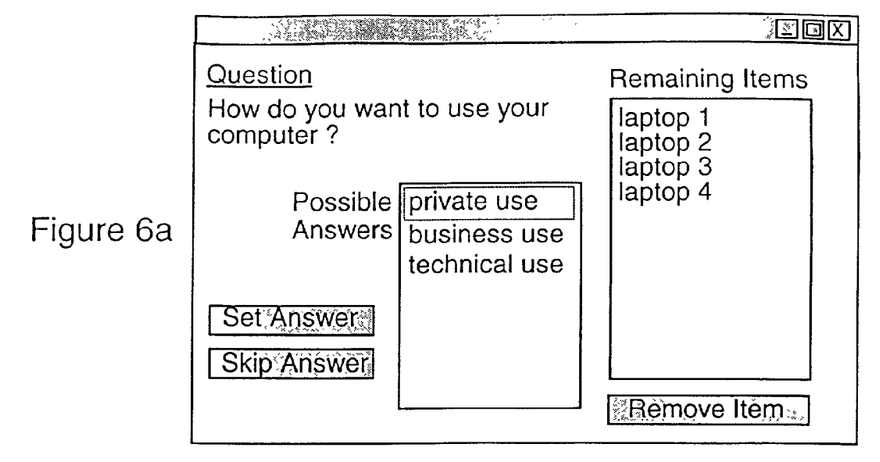
FIGS. 6a, 6b and 6c illustrate successive screen shots as displayed to a user for a specific needs-based interview scenario.
Figure 6B:
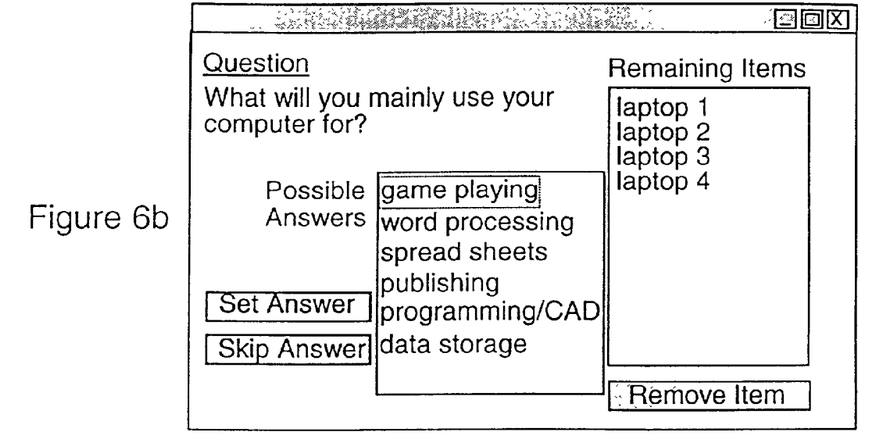

A specific example of an interview session will now be described with reference to FIGS. 6a to 6c. In this simple example, it is assumed that the product set defined in the first, question request received by QA planner 22 contains four products, and the combined products, needs & rules database stored in memory 14 for the session contains the following definitions:

Definitions of 4 Customer Needs-Questions
   need-1 <presentations> with prompt "Do you intend to do presentations with your computer?" and possible answers <yes> (p=0.3) and <no> (p=0.7)
   need-2 <main use> with prompt "What will you mainly use your computer for?" and possible answers <game playing> (p=0.3), <word processing> (p=0.3), <spread sheets> (p=0.2), <publishing image processing> (p=0.2), <program development or CAD> (p=0.2), <data storage>
   need-3 <data> with prompt "Will you use your computer to store client data and/or document collections?" and possible answers <yes> (p=0.3), and <no> (p=0.7)
   need-4 <modelRange> with prompt "How to you want to use your computer?" and possible answers <private use> (p=0.3), <business use> (p=0.5), <technical use> (p=0.2).

Definitions of 4 Rules
   rule-1: if-needs (<presentations>=<yes>) then-require (<LCD screen type>=<active>)
   rule-2: if-needs (<main use>=<game playing>) then-require ((<processor speed>=<300>) OR (<processor speed>=<400>))

rule-3: if-needs ((<modelRange>=<business use>) AND (<main use>=<word processing>)) then-require (((<processor speed>=<300>) OR (<processor speed>=<400>)) AND ((<hard disk GB>=<3>) OR (<hard disk GB>=<4>)))

rule-4: if-needs ((<modelRange>=<business use>) AND (<main use>=<spread sheets>)) then-require (<processor speed>=<400>)

Definitions of 4 Products laptop-1 with reject probability $P_{reject}$=0.7 (<building pointing device>=<stick pointer>, <LCD screen type>=<passive>, <processor speed>=<200>, <hard disk GB>=<2>)

laptop-2 with reject probability $P_{reject}$=0.3 (<building pointing device>=<stick pointer>, <LCD screen type>=<active>, <processor speed>=<400>, <hard disk GB>=<2>)

laptop-3 with reject probability $P_{reject}$=0.3 (<building pointing device>=<stick pointer>, <LCD screen type>=<active>, <processor speed>=<300>, <hard disk GB>=<4>)

laptop-4 with reject probability $P_{reject}$=0.7 (<building pointing device>=<stick pointer>, <LCD screen type>=<passive>, <processor speed>=<400>, <hard disk GB>=<4>)

The result of the rule weight calculation (steps 26 to 29 of FIG. 3) here is as follows:

rule-1: reject laptop-1 and laptop-4: weight $W_R$=0.7+0.7=1.4 rule-2: reject laptop-1: weight $W_R$=0.7 rule-3: reject laptop-1 and laptop-2: weight $W_R$=0.7+0.3=1 rule-4: reject laptop-1 and laptop-3: weight $W_R$=0.7+0.3=1

The result of the answer score calculation by distribution of rule weights (steps 31 to 33 of FIG. 3) is as follows:

rule-1: $A_s$(<presentations>=<yes>)=1.4 rule-2: $A_s$(<main use>=<game playing>)=0.7 rule-3: $A_s$(<modelRange>=<business use>)=0.5; $A_s$(<main use>=<word processing>) =0.5 rule-4: $A_s$(<modelRange>=business use)=0.5; $A_s$(<main use>=<spread sheets>)=0.5

The result of the question score calculation by weighting and summation of answer scores (step 34 of FIG. 3) is as follows:

need-1 <presentations> $Q_S$=1.4*0.3=0.42 need-2 <main use> $Q_S$=(0.7*0.3)+(0.5*0.3)+ (0.5*0.2)=0.21+0.15+0.1=0.46 need-3 <data> $Q_S$=0 need-4 <modelRange> $Q_S$=(0.5*0.5)+(0.5*0.5)=0.5

Therefore the needs-question "modelRange" is the one with the highest question score and is selected by the QA planner and supplied to feature-based engine 5 for display to the user together with the associated answers. (In this simple example, it is assumed that all answers are supplied with the question and not merely those with non-zero answer scores as discussed above). FIG. 6a illustrates an example of the screen displayed to the user at this stage.

Assume that the answer given by the user to this question is <business use>. This answer does not result in firing of any rules (step 56 of FIG. 5), so the product set is unchanged when the next question request is received by the QA planner (assuming no intervening feature-based filtering). In this simple example, it is assumed that the same product scores and reject probabilities are used for successive question selection cycles, rather than selecting these values from groups of predicted values as described above. In this case therefore, the question scores recalculated for the remaining needs-questions will be unchanged, so that the needs-question <main use> now has the highest score and is selected next. (In practice, for simple embodiments like this the QA planner can be configured to recognize this situation to avoid recalculation of the question scores when no rules have fired and the product set is unchanged). FIG. 6b illustrates the resulting screen display.

Now assume that <spread sheet> is the answer supplied. This answer causes rule-4 to fire and leads to the removal of laptop-1 and laptop-3 from the remaining items list when the constraint imposed by firing of the rule is returned to feature-based engine 5. Rule-2 and rule-3 are also deemed expired because they cannot fire anymore given that the answer was <spread sheets> (and not <game playing> or <word processing>).

When the next question request is received (assuming no intervening feature-based filtering) rule-1 is the now the only "open" rule, so the question score calculation is as follows:

rule-1: reject laptop-4: weight $W_R$=0.7 rule-1: $A_s$(<presentations>=<yes>)=0.7 need-1 <presentations> $Q_S$=0.7 *0.3=0.21

Figure 6C:
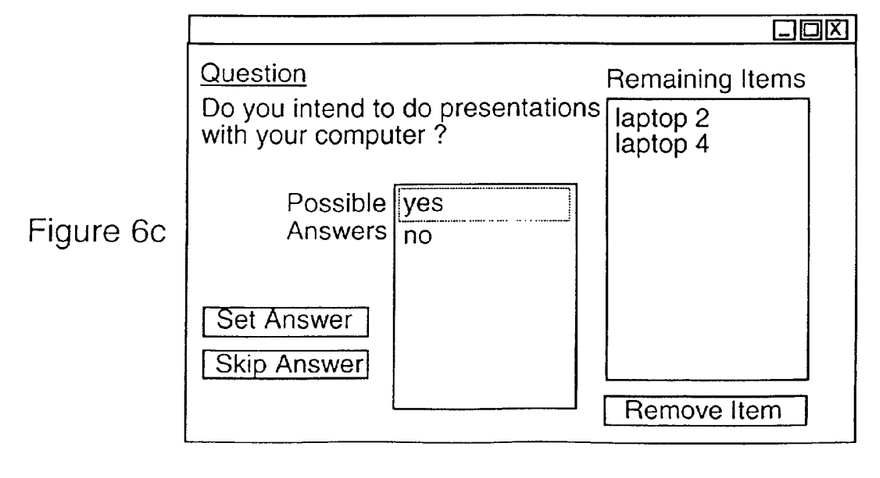

Thus, needs-question <presentations> is the only one receiving a score (<data> is never used in a rule in this example) and thus gets asked as shown in FIG. 6c. In this scenario, the user answers <yes> to this question which makes rule 1 fire, and laptop 4 is eliminated from the product set by feature-based engine 5. Thus the user has been successfully led to identification of a suitable product, namely laptop 2. It will be noted that, in this example, the user display gives the user the option to remove an item from the remaining product set, or to skip a particular question. In the former case, the interview management component will be advised of the revised product set in the usual way with the next question request. In the latter case, the feature-based engine will supply a predefined "Answer Skipped" message to the interview component in place of the normal user answer, and the QA planner can simply proceed as usual.

The question selection method in the above embodiment provides an example of the case where the question scores are dependent, inter alia, on the product scores of products excluded from the product set if the various rules fire. Clearly, however, a similar result could be achieved by considering product scores of products retained in, rather than excluded from, the product set by minor modification of the above process. An alternative method will now be described in which the question scores depend, inter alia, on the product scores of products retained if the various rules fire, and where the rule weight is a more complex function of product scores based on the expected "utility" of products. In particular, in this example, the utility of a product $U_P$ is a function of two utility values, namely a seller score, or seller utility value, $U_{seller}$, and a buyer score, or buyer utility value, $U_{buyer}$. The seller utility value $U_{seller}$ is a value indicating the "utility" of the product to the product supplier, for example based on profit margin of the product. The buyer utility value $U_{buyer}$ is a value indicating the expected suitability or "utility" of the product to the user, and in a simple case may be determined from the reject probability of the product, e.g. as ($1-P_{reject}$). In addition, the product utility $U_P$ is further dependent on relative weighting factors $W_{seller}$ and $W_{buyer}$, set by the product supplier and stored in the system, which reflect the selling strategy. Specifically:

$$U_P = (W_{seller} * U_{seller}) + (W_{buyer} * U_{buyer})$$

Clearly, if $W_{seller}$ is much larger than $W_{buyer}$ then this is a very seller driven, up-selling strategy in that the main optimization criterion will be the supplier utility. If $W_{seller}$ is much smaller than $W_{buyer}$, the strategy becomes a buyer-utility oriented strategy. Both $U_{seller}$ and $U_{buyer}$ may be pre-stored as product scores for a particular product, or may be derived from more basic product scores, e.g. as for the simple case of $U_{buyer} = (1 - P_{reject})$ mentioned above. In any case, the product utility $U_P$ can be used for ranking the products in the current product set in order of decreasing utility. This in turn can be used to introduce the concept of a "Focus Set" which represents the "n" top-ranked products from the product set where n is a predetermined integer. In some systems, when displaying the list of potentially suitable products to the user, the content of this focus set will be displayed in the sequence of the ranking.

In the particular embodiment to be described, the weight $W_R$ of a rule is dependent on a "focus set value" calculated for the resulting product set if a rule fires. Specifically, the rule weight is dependent on the difference between the resultant focus set value, calculated for the resulting product set, and the current focus set value, calculated for the current product set. The focus set (FS) value in each case is defined as:

FS value=average product utility $U_P$ for products in the FS=(Sum over FS products$\{(W_{seller}*U_{seller})+(W_{buyer}*U_{buyer})\}$)/No. products in FS Clearly, where there are at least n products in the product set, then there will be n products in the focus set, but where there are (x<n) products in the product set, then there will only be x products in the focus set. The rule weight $W_R$ is given by:

$W_R$={FS value (resulting product set)–FS value (current product set) }

Thus, the weight of a rule is determined by the increase in the focus set value resulting from firing of that rule.

Figure 7:
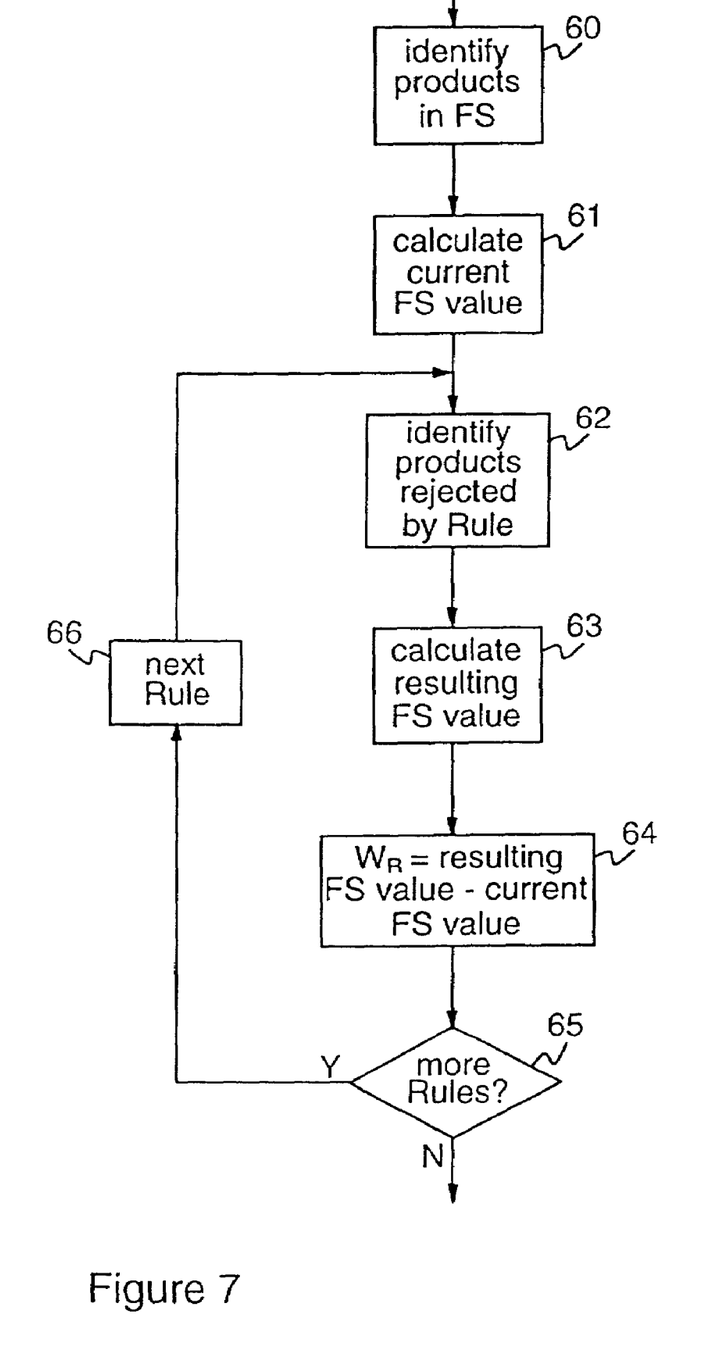
FIG. 7 is a flow chart illustrating an alternative method for rule weight calculation in the question selection process of FIG. 3.

FIG. 7 illustrates the steps involved in rule weight calculation during the question selection process in this embodiment. The calculation of answer scores by distribution of rule weights, and the calculation of question scores, is unchanged from the embodiment of FIG. 3. Thus, FIG. 7 represents an alternative to steps 26 to 29 in FIG. 3. The process begins at step 60 where the QA planner 22 determines the content of the focus set for the current product set by ranking the products according to the product utility values $U_P$ (which may be calculated from more basic product scores if necessary as described above). Next, in step 61 the QA planner calculates the current focus set value by averaging the product utility values over the focus set as described above. In step 62, the QA planner determines, for the first rule, which (if any) products will be rejected if that rule fires. Then, in step 63, the focus set value for the resultant product set, i.e. excluding any rejected products, is calculated. The rule weight $W_R$ is then calculated in step 64 as the difference between the resultant and current focus set values. In step 65, the QA planner determines if there are more rules to weighted, and, if so, the next rule is selected in step 66 and operation reverts to step 62 to repeat the rule weight calculation steps for this next rule. This process thus continues until all rules have been weighted and no further rules are found in step 65. The question selection operation can then continue as steps 30 to 35 of FIG. 3.

The above process of rule weight calculation based on focus set values can be extended to incorporate utility values assigned by parties other than simply the buyer and seller. For example, the catalog system may be operated by a broker that is performing the interviewing to help a user to choose between multiple products of multiple suppliers. Here the interests of all involved parties (user, broker, supplier1..suppliern) can be considered. Thus, the product utility values $U_P$ may be additionally dependent on a broker utility value $U_{broker}$, and a corresponding weighting factor $W_{broker}$, i.e.:

$$U_P = (W_{broker}*U_{broker}) + (W_{seller}*U_{seller}) + (W_{buyer}*U_{buyer})$$

In the above embodiment, the rule weight depends on the resultant focus set value which in turn is calculated using product scores which are predetermined in the system for particular products. In alternative embodiments, the product scores, and in particular the buyer utility values $U_{buyer}$, may be calculated in operation based on values assigned to product features by individual rules. Thus, rather than merely relating answers to required product features, the rules may also specify utility values for the product features, and these "feature utility values" can be used to calculate a product score for a given product according to the utility values assigned by a rule to that product's features. A simple example of such a rule might be:

If-needs (<presentations>=<yes>) then-(Utility 0.3 (<processor speed>=<300>) AND (Utility 0.6 (<processor speed>=<400>)

This indicates that, if the answer to the needs-question "presentations" is "yes", then a feature utility value of 0.3 is assigned to the feature <processor speed>=<300>, and a feature utility value of 0.6 is assigned to the feature <processor speed>=<400>. The product score (here the buyer utility value $U_{buyer}$), of each product in the product set is then determined by summing the feature utility values assigned to that product's features by the rule. Thus, for the simple example above, any product having a processor speed of 300 will receive a product score of $U_{buyer}$=0.3, and any product having a processor speed of 400 will receive a product score of $U_{buyer}$=0.4. This type of rule still relates answers to product feature constraints since only those specifications of a particular feature type which receive a non-zero utility value are still "allowed". Thus, the products retained in the product set if a particular rule fires will be those products having a non-zero product score after summation of the feature utility values assigned by the rule for each product's features. The product scores calculated in this way can be temporarily stored in the system and then used to calculate the rule weight. The rule weight can be determined in various ways, for example: simply by summing the buyer utility values alone; or using product utility values $U_P$ derived as defined above using seller/broker utility values and associated weighting factors in addition to the buyer utility values; or in dependence on the resultant focus set value as described above.

It will be seen from the foregoing that embodiments of the invention provide systems which allow effective needs-based question selection for an arbitrary initial product set, and thus allow efficient use of needs-based interviewing in combination with feature-based filtering according to the type of assistance required by users during the product selection process. The interview control logic can use information about products, product features, buyer needs and corresponding product features, and statistical parameters to provide an adaptive interviewing strategy that minimizes at any step in the interview the expected effort for reaching a buying decision. Further, through use of the prediction engine as discussed above, embodiments are able to adapt over time to changing preferences of buyer communities. It is to be appreciated, however, that while preferred embodiments of the invention have been described above, many changes, extensions and modifications can be made to these embodiments without departing from the scope of the invention. By way of example, while product scores are stored in database 12 in the above embodiments, in other embodiments the product scores could be stored together with the statistical data in database 21. In general, the data required for operation of the interview component may be formulated and stored in various ways in the system, in one or more databases as desired.

Further, while the embodiments described above select a single question as the next best question to be presented to the user based on the current product set, in other embodiments more than one question may be selected, for example the best 5 questions based on the question scores, and this set of questions may be presented concurrently to the user. The user can then answer any or all of these questions as desired, the answers being forwarded by the feature-based engine to the QA planner which can determine the consequent feature constraints as before.

Moreover, in the particular embodiments described above, the needs-questions include a prompt expressed specifically in the form of a sentence, ending in a question mark, to be displayed to the user, e.g. "How do you want to use your computer?", with answer options <private use>, <business use> and <technical use>. It will be appreciated however that the questions need not be expressed strictly as text questions in this way. For example, the questions might be presented in the form of instructions to select between the answer options which are presented as hyperlinks, e.g. "Click here if you are a business user"; "Click here if you are private user", etc. Thus, while the principle is to present the user with a question which has associated answer options, the questions themselves may be defined in the system, and presented to the user, in various ways as any form of invitation to the user to indicate his answer, and the term "question" as used herein is to be construed accordingly.

An example of an extension to the above embodiments would be to allow "personalized" product offerings, where different products or product features are offered to different categories of customer. As a simple example, products such as insurance policies might have features which take different values depending on the customer's age. In this case, the QA planner could be configured to determine the appropriate products/product features from the initial set of product data according to the user's answers, and use the appropriate data in the rule weight calculation process. A further extension might be for the prediction engine to monitor the "drop-out" rate in the interview process, i.e. where the user abandons the session before reaching a successful conclusion. This could be achieved by adding a "Drop-Out" option in addition to the "Skip Question" option in the screen displayed to the user. This would allow the prediction engine to count drop-outs for each of the questions for a given point in the interview dialog, and this information could then be used in the question selection process. For example, the question scores could be weighted to account for drop-out probability, so that questions with a higher probability of drop-out are less likely to be selected by the QA planner, thus reducing the risk of the customer abandoning the interview.

As a further example, in the description of the above embodiments it is assumed that each catalog product has a plurality of features (such as a product <laptop-1> with the features: <building pointing device>=<stick pointer>; <LCD screen type>=<passive>; <processor speed>=<200>; and <hard disk GB>=<2>), and that the rules relate answers to one or more of these individual features. However, simple applications can be envisaged where products effectively have only one feature, that is the name or identity of the product itself, i.e. <laptop-1> in the above example. Here, a rule relating an answer to product feature constraints might be simply: If-needs <presentations>=<yes> then-require (<laptop-1> OR <laptop-2>). As with the more complex systems described above, such a system can be used to select questions to distinguish between products in an arbitrary initial product set, resulting from previous feature-based filtering or otherwise, but in this case any previous "feature-based filtering" may simply consist of selecting the products themselves.

As a further extension, the question selection methods described above could be applied to generate "stand-alone" decision trees for selected initial product sets. That is, the control logic could be operative in a particular mode to perform the question-selection process repeatedly, for a defined initial product set, so that after selecting the initial question, the next best question for each possible answer is determined and stored, and for each of these questions, the next best question for each answer is also determined and stored, and so on. In this way, a decision tree is generated for that particular initial product set. This could be done, for example, for particularly common product sets, based on operator input or as determined by the prediction engine through monitoring operation of the system. Such decision trees could be stored in system memory, so that, when a question request is received for a product set for which a decision tree exists, the control logic can use the appropriate decision tree to determine the line of questioning. Where this facility is provided, the control logic may include a "decision tree interpreter" which deals with question sessions based on these decision trees, and responsibility for the question session may be passed by the QA planner or session manager to the decision tree interpreter when the product set for the session corresponds to one of the prestored decision trees.

What is claimed is:

1. A method for selecting, in an electronic product catalog system, a question to be presented to a user of the system to assist identification of a suitable product from a set of potentially suitable products according to the user's needs, the question being selected from a group of questions stored in said system, which method comprises:

processing in the electronic product catalog system product data stored in the electronic product catalog system;

defining, in the electronic product catalog system, features of products in said set and product scores associated with respective products in said set, and rule data stored in the electronic product catalog system;

defining, in the electronic product catalog system, rules relating answers associated with said questions to product feature constraints, to calculate question scores ($Q_s$) for respective said questions such that the question score ($Q_s$) for each question is dependent on one of:

(a) for each rule relating to any answer associated with that question, the product scores of any products excluded from said set if said rule relating to an answer associated with that question is effective;

(b) for each rule relating to any answer associated with that question, the product scores of any products retained in said set if said rule relating to an answer associated with that question is effective;

processing, in the electronic product catalog system, the product data and the rule data to calculate weights ($W_R$) for respective rules such that the weight ($W_R$) for each rule is dependent on one of (c) the product scores of any products excluded from the set if that rule is effective, and (d) the product scores of any products retained in the set if that rule is effective;

for each rule, assigning answer scores ($A_s$) dependent on the weight ($W_R$) of that rule to the answers to which that rule relates;

calculating, in the electronic product catalog system, the question scores ($Q_s$) such that the question score ($Q_s$) for each question is dependent on the answer scores ($A_s$) for the answers associated with that question; and selecting, in the electronic product catalog system, the question to be presented to the user in dependence on said question scores ($Q_s$).

2. A method as claimed in claim 1 wherein the question score ($Q_s$) for each question is dependent on only one of (a) and (b).

3. A method as claimed in claim 1 wherein the product scores are predetermined in said system (1) for respective products.

4. A method as claimed in claim 3 wherein said product scores comprise, for each product, a group of product scores each associated with a different set of predefined user needs, and wherein the method includes selecting from the group of product scores for a product the product score corresponding to a current set of user needs.

5. A method as claimed in claim 3 wherein said product scores comprise product probabilities each indicative of a probability of the associated product being suitable for the user.

6. A method as claimed in claim 5 wherein said product probabilities are product reject probabilities each defining the probability of the associated product being rejected as a suitable product for the user.

7. A method as claimed in claim 1 including calculating the product scores associated with respective products in dependence on values assigned to product features by said rules.

8. A method as claimed in claim 1 wherein the weight ($W_R$) for each rule is dependent on a resultant set value, which value is dependent on product scores of at least a subset (FS) of any products retained in said set if that rule is effective.

9. A method as claimed in claim 8 wherein the weight ($W_R$) for each rule is dependent on the difference between a current set value, dependent on the product scores of at least a subset (FS) of the products in said set, and said resultant set value.

10. A method as claimed in claim 8 wherein said product scores comprise, for each product, a buyer score indicative of the expected suitability of the product for the user, and a seller score, indicative of the benefit to the product supplier associated with sale of the product, and wherein each said set value is dependent on the buyer score and seller score of each product in said subset (FS).

11. A method as claimed in claim 10 wherein each set value is further dependent on additional data stored in said system.

12. A method as claimed in claim 1 wherein, for each said question, answer probabilities indicative of the probability of a user providing respective answers associated with that question, are pre-stores in the system, and wherein the question score ($Q_s$) for each question is also dependent on the answer probabilities for respective answers associated with that question.

13. A method as claimed in claim 12 wherein, for each answer, a plurality of answer probabilities are pre-stored in the system, each answer probability indicating the probability of a user providing that answer for a different set of predefined user needs, and wherein the method includes selecting for a said answer the answer probability corresponding to a current set of user needs.

14. A method as claimed in claim 1 wherein said set of potentially suitable products is determined by previous interaction of the user with said system.

15. A method as claimed in claim 14 including receiving data defining said set of potentially suitable products from a feature-based filtering component (2) of said system (1).

16. A method as claimed in claim 1 including supplying the selected question for display to the user.

17. A method as claimed in claim 16 including supplying at least some answers associated with the selected question for display to the user.

18. A method as claimed in claim 17 including supplying the answers for display in an order dependent on the answer scores (As) thereof.

19. A method as claimed in claim 16, including, after supplying the selected question for display to the user:
receiving from a feature-based filtering component (2) data indicative of the answer given by the user in response to the selected question; and
determining whether any of the rules are effective based on the user's answer, and if so supplying data indicative of any products eliminated from said set of products to the feature-based filtering component (2).

20. A method as claimed in claim 1 including, prior to selecting said question to be presented to a user:
generating question data, comprising said group of questions, and storing the question data in said system (1);
generating catalog data, including said product data for products in said set, defining features of catalog products and product scores associated with respective products, and storing the catalog data in said system (1); and
generating said rule data and storing the rule data in said system (1).

21. Apparatus for selecting a question to be presented to a user of an electronic product catalog system to assist identification of a suitable product from a set of potentially suitable products according to the user's needs, the apparatus comprising:
memory for storing question data, comprising a group of questions from which a question is to be selected, product data, defining features of products in said set and product scores associated with respective products in said set, and rule data defining rules relating answers associated with said questions to product feature constraints; and
control logic configured to process said product data and said rule data to calculate question scores ($Q_s$) for respective said questions such that the question score ($Q_s$) for each question is dependent on one of (a) for each rule relating to any answer associated with that question, the product scores of any products excluded from said set if said rule relating to an answer associated with that question is effective, and (b) for each rule relating to any answer associated with that question, the product scores of any products retained in said set if said rule relating to an answer associated with that question is effective;

the control logic further configured to process the product data and the rule data to calculate weights ($W_R$) for respective rules such that the weight ($W_R$) for each rule is dependent on one of (c) the product scores of any products excluded from the set if that rule is effective, and (d) the product scores of any products retained in the set if that rule is effective;

the control logic further configured to assign answer scores ($A_s$) for each rule dependent on the weight ($W_R$) of that rule to the answers to which that rule relates;

the control logic further configured to process and calculate the question scores ($Q_s$) such that the question score ($Q_s$) for each question is dependent on the answer scores ($A_s$) for the answers associated with that question; and wherein the control logic (8) is configured to select the question to be presented to the user in dependence on said question scores ($Q_s$).

22. Apparatus as claimed in claim 21 wherein the control logic (8) is responsive to receipt, from a feature-based filtering component (2) of said system (1), of data defining said set of potentially suitable products to calculate said question scores and select the question to be presented to the user, the control logic (8) being further configured to supply the selected question to the feature-based filtering component (2) for display to the user.

23. An electronic product catalog system (1) comprising apparatus as claimed in claim 21.

24. The method of claim 1 wherein the calculation of the question scores further comprises:

weighing an answer score for each answer associated with a question according to an answer probability specified for an answer to the question; and summing the answer scores for the answers associated with that question.

25. A computer program product comprising:

a computer useable medium having computer readable code means embodied therein for causing a computer to select, in an electronic product catalog system, a question to be presented to a user of the system to assist identification of a suitable product from a set of potentially suitable products according to the user's needs, the question being selected from a group of questions stored in the system, the computer readable code means in the computer program product comprising:

computer readable program code means for causing a computer to process product data stored in the system, define features of products in the set and product scores associated with respective products in the set, and rule data stored in the system, define rules relating answers associated with the questions to product feature constraints, to calculate question scores ($Q_s$) for respective questions such that the question score ($Q_s$) for each question is dependent on one of (a) for each rule relating to any answer associated with that question, the product scores of any products excluded from the set if the rule relating to an answer associated with that question is effective, and (b) for each rule relating to any answer associated with that question, the product scores of any products retained in the set if the rule relating to an answer associated with that question is effective;

computer readable program code means for processing the product data and the rule data to calculate weights ($W_R$) for respective rules such that the weight ($W_R$) for each rule is dependent on one of (c) the product scores of any products excluded from the set if that rule is effective, and (d) the product scores of any products retained in the set if that rule is effective;

computer readable program code means for assigning answer scores ($A_s$), for each rule, dependent on the weight ($W_R$) of that rule to the answers to which that rule relates;

computer readable program code means for calculating the question scores ($Q_s$) such that the question score ($Q_s$) for each question is dependent on the answer scores ($A_s$) for the answers associated with that question; and computer readable program code means for causing a computer to select the question to be presented to the user in dependence on the question scores ($Q_s$).

26. An article of manufacture comprising:

a computer useable medium having computer readable program code means embodied therein for causing a computer to select, in an electronic product catalog system (1), a question to be presented to a user of the system (1) to assist identification of a suitable product from a set of potentially suitable products according to the user's needs, the question being selected from a group of questions stored an the system (1), the computer readable code means in the article of manufacture comprising:

computer readable program code means for causing a computer to process product data stored in the system (1), define features of products in the set and product scores associated with respective products in the set, and rule data stored in the system (1), define rules relating answers associated with the questions to product feature constraints, to calculate question scores ($Q_s$) for respective questions such that the question score ($Q_s$) for each question is dependent on one of (a) for each rule relating to any answer associated with that question, the product scores of any products excluded from the set if the rule relating to an answer associated with that question is effective, and (b) for each rule relating to any answer associated with that question, the product scores of any products retained in the set if said rule relating to an answer associated with that question is effective;

computer readable program code means for processing the product data and the rule data to calculate weights ($W_R$) for respective rules such that the weight ($W_R$) for each rule is dependent on one of (c) the product scores of any products excluded from the set if that rule is effective, and (d) the product scores of any products retained in the set if that rule is effective;

computer readable program code means for assigning answer scores ($A_s$), for each rule, dependent on the weight ($W_R$) of that rule to the answers to which that rule relates; computer readable program code means for calculating the question scores ($Q_s$) such that the question score ($Q_s$) for each question is dependent on the answer scores ($A_s$) for the answers associated with that question; and computer readable program code means for causing a computer to select the question to be presented to the user in dependence on the question scores ($Q_s$).

27. A method for selecting, in an electronic product catalog system, a question to be presented to a user of the system to assist identification of a suitable product from a set of potentially suitable products according to the user's needs, the question being selected from a group of questions stored in the system, the method comprising:

processing, in the electronic product catalog system, product data stored in the system;

defining, in the system, features of products in the set and product scores associated with respective products in the set, wherein the product scores comprise product probabilities that are product reject probabilities, each defining the probability of the associated product being rejected as a suitable product for the user, each product score indicative of a probability of the associated product being suitable for the user and predetermined in the system for the respective product, and rule data stored in the system;

defining, in the system, rules relating answers associated with the questions to product feature constraints, to calculate question scores ($Q_s$) for respective questions such that the question score ($Q_s$) for each question is dependent on one of:

(a) for each rule relating to any answer associated with that question, the product scores of any products excluded from the set if the rule relating to an answer associated with that question is effective; and (b) for each rule relating to any answer associated with that question, the product scores of any products retained in the set if the rule relating to an answer associated with that question is effective;

calculating, in the system, a weight ($W_R$) for each rule that is dependent on the sum of the reject probabilities of any products excluded from the set if that rule is effective; and selecting, in the system, the question to be presented to the user in dependence on said question scores ($Q_s$).

* * * * *